(No Model.)
C. H. MARSHALL.
FLOUR HOLDER AND SIFTER.
No. 397,737. Patented Feb. 12, 1889.
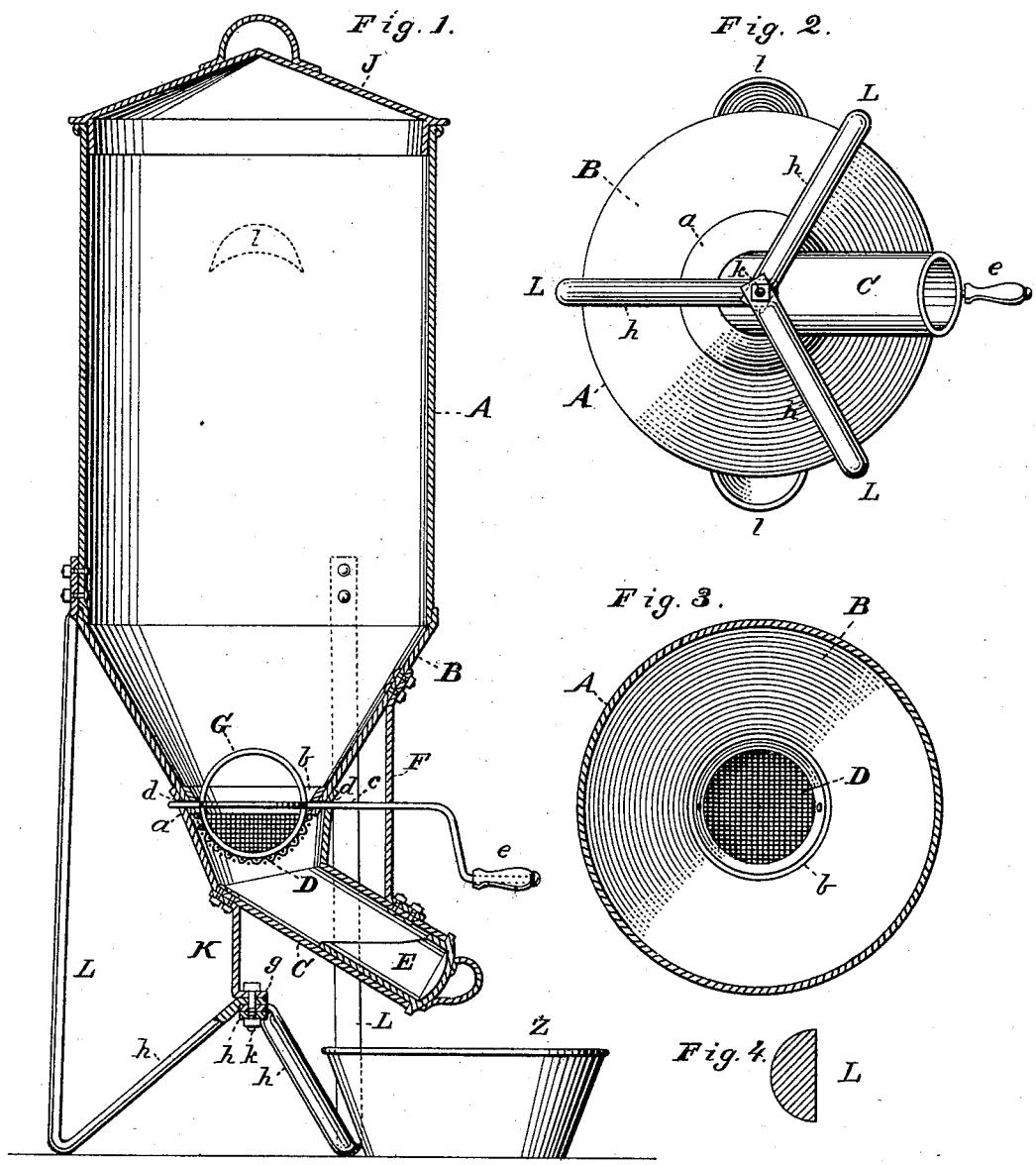
WITNESSES,
Villette Anderson,
Mary Pyhin.
INVENTOR,
Charles H. Marshall,
by E. W. Anderson.
Attorney.

UNITED STATES PATENT OFFICE.

CHARLES H. MARSHALL, OF WOOD RIVER, NEBRASKA.

FLOUR HOLDER AND SIFTER.

SPECIFICATION forming part of Letters Patent No. 397,737, dated February 12, 1889.

Application filed September 20, 1888. Serial No. 285,875. (No model.)

*To all whom it may concern:*

Be it known that I, CHARLES H. MARSHALL, a citizen of the United States, and a resident of Wood River, in the county of Hall and State of Nebraska, have invented certain new and useful Improvements in Flour Holders and Sifters; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention and is a vertical section. Fig. 2 is a bottom view with the scoop-stopper removed. Fig. 3 is a detail. Fig. 4 is also a detail.

This invention has relation to metallic flour-cases adapted to hold flour and to facilitate its use in families; and the invention consists in the construction and novel combination of devices, as hereinafter set forth, and pointed out in the appended claims.

In the accompanying drawings, the letter A designates a cylindrical case having a base, B, in the form of a frustum of a cone, to the lower and smaller end of which is attached the mouth $a$ of an obtuse-angled spout, C, said mouth $a$ being of larger diameter than the lower end of the frustum and overlapping the same exteriorly, so that the end of the frustum extends downward into said mouth, as illustrated.

D is a hemisphere of wire-cloth having a circular frame, $b$, which is secured to the margin of the lower opening of the frustum. Through this wire-cloth sieve the flour in the case is designed to descend into the spout C, when it is received in a scoop-shaped stopper, E, which closes the lower end of the spout.

G is an agitator or feeder made of wires bent in circular form, and provided with a shaft, $c$, which extends through bearings $d$ in the wall of the case, and is provided with a crank-handle, $e$, extending through a brace, F, which connects the front of the spout to the case above, strengthening this part of the holder, so that it will stand the strain of working the feed or manipulating the scoop. The spout is further braced by a short angle-iron, K, which is bolted to the bottom portion thereof just below the angle, said angle-iron extending downward and having a lug-flange, $g$, to which are bolted the upturned short ends $h\,h$ of the angle-legs L L, which have their longer portions secured to the sides of the case, as shown. A single short bolt, $k$, serves to connect the short ends of all the angle-legs to each other and to the short vertical center brace, K, of the spout. Of these legs L, one is located at the rear of the case and two others at the sides and somewhat in front, their lateral position allowing room for the spout and crank-handle between them. Their position and formation also facilitate the attachment of the pan or receiver $z$ to their lower portions, said pan extending outward beyond the end of the spout and serving not only to avoid loss of flour when the scoop is being moved, but also to secure neatness in the kitchen or pantry, the flour being prevented from falling on the floor. Lugs $l$ at the side of the case serve to facilitate handling the same, and a close-fitting cover, J, prevents the access of insects or dust.

Metallic flour-cases are preferred to others because of their comparative freedom from vermin; but the sheet metal of which they are composed being light, such cases are easily injured, especially when raised upon attached legs. In this invention it is designed to provide a strong case having its legs so attached that they will not only brace the case, but also assist each other in securing mutual strength and firmness.

Having described this invention, what I claim, and desire to secure by Letters Patent, is—

1. A metallic flour case and sifter of cylindrical form, having its lower portion a cone frustum let into an angular spout, front and rear braces to the spout, and angle-legs having short ends, turned inward and upward and secured to each other and to the rear brace of the spout, substantially as specified.

2. In a metallic flour-case, the combination, with the cylinder-case and its angular spout, of the lateral angle-legs bent inward and upward, the receiving-case secured to the lateral legs, the rear angle-leg, and the short brace-iron connecting said angle-legs to the spout, substantially as specified.

In testimony whereof I affix my signature in presence of two witnesses.

C. H. MARSHALL.

Witnesses:
 W. MERCER,
 JAS. EWING.